(12) United States Patent
Hakuya et al.

(10) Patent No.: US 8,178,598 B2
(45) Date of Patent: May 15, 2012

(54) POLYOXYALKYLENE POLYAMIDE-GLYCIDYL ETHER ADDUCT EPOXY RESIN CURING AGENT

(75) Inventors: Keisuke Hakuya, Yokosuka (JP); Michael Ian Cook, De Mern (NL); Kouichi Sakasegawa, Kawasaki (JP); Yoshimi Hasegawa, Kawasaki (JP)

(73) Assignee: Air Products and Chemicals, Inc., Allentown, PA (US)

( * ) Notice: Subject to any disclaimer, the term of this patent is extended or adjusted under 35 U.S.C. 154(b) by 554 days.

(21) Appl. No.: 11/811,800

(22) Filed: Jun. 12, 2007

(65) Prior Publication Data

US 2008/0045659 A1    Feb. 21, 2008

(30) Foreign Application Priority Data

Jun. 29, 2006   (JP) ................. 2006-179544

(51) Int. Cl.
- *C08G 59/44* (2006.01)
- *C08G 69/36* (2006.01)
- *C08K 5/01* (2006.01)
- *C08K 5/05* (2006.01)
- *C08L 63/00* (2006.01)

(52) U.S. Cl. ........ 523/456; 523/428; 523/454; 523/455; 523/463; 523/464; 523/420.5; 523/421; 523/423; 523/430; 528/338; 528/339; 528/339.3; 528/339.5; 528/340; 528/342

(58) Field of Classification Search .................. None
See application file for complete search history.

(56) References Cited

U.S. PATENT DOCUMENTS

| | | | |
|---|---|---|---|
| 3,257,342 A * | 6/1966 | Kwong | 528/405 |
| 3,474,056 A | 10/1969 | Schneider et al. | |
| 3,870,666 A | 3/1975 | Becker | |
| 3,998,771 A * | 12/1976 | Feneis et al. | 523/442 |
| 4,133,803 A * | 1/1979 | Klein | 528/340 |
| 4,533,719 A | 8/1985 | Waddill | |
| 5,424,371 A * | 6/1995 | Frihart et al. | 525/420.5 |
| 6,540,792 B1 * | 4/2003 | Ishii et al. | 8/115.51 |

FOREIGN PATENT DOCUMENTS

| | | | |
|---|---|---|---|
| DE | 2519390 A | * 11/1975 | |
| JP | 2002-114835 A | 4/2002 | |
| JP | 2002-114835 A | * 4/2002 | |
| WO | 03/020789 A1 | 3/2003 | |

OTHER PUBLICATIONS

Breuer, T. E., "Timer Acids," J. I. Kroschwitz (ed.), Kirk-Othmer Encyclopedia of Chemical Technology, 4th Ed., Wiley, New York, 1993, vol. 8, pp. 223-237.

* cited by examiner

*Primary Examiner* — Robert Sellers
(74) *Attorney, Agent, or Firm* — Michael K. Boyer

(57) ABSTRACT

A curing agent for epoxy resin, and a coating composition using the curing agent curing agent that delivers excellent recoatability and overcoatability after a long time exposure.

(A) An epoxy curing agent that is derived by adduction between amide-type reactants from polyamine compounds comprising from 25-75 mol % of a polyoxyalkylene-polyamine and carboxylic acids or a mixture thereof and glycidyl ether compound;

(B) An epoxy curing agent of the mixture of (B1) amide-type reactants prepared through polyoxyalkylene-polyamine and carboxylic acids or a mixture thereof, and (B2) a reactant is derived by adduction between other aliphatic polyamines or a mixture thereof and glycidyl ether compound.

Coating composition comprising the epoxy curing agent of the above described A or B.

19 Claims, 2 Drawing Sheets

POLYOXYALKYLENE POLYAMIDE-GLYCIDYL ETHER ADDUCT EPOXY RESIN CURING AGENT

FIELD OF THE INVENTION

The present invention relates to a curing agent for epoxy resin, and a coating composition using the curing agent. The curing agent for epoxy resin and the coating composition according to the present invention can exhibit various excellent characteristics similarly to those of generally-usable epoxy resin coating composition systems, and in particular, can exhibit an excellent characteristic suitable to recoating and overcoating after long term exposure in anti-corrosion coatings.

BACKGROUND OF THE INVENTION

The curing agent for epoxy resin and the coating composition according to the present invention can be used with no specific limitation in various fields and applications, but in the following, the background art relating to "anti-corrosion coatings" is mainly described for convenience of explanation.

Steel constructions such as typically ships, bridges, tanks and plants are exposed to severe corrosion environments over a long period of time, and in general therefor, anti-corrosion coatings are applied thereto.

Such coatings are specifically referred to as heavy anticorrosion coatings. The heavy-anticorrosion coating generally comprises a multi-layered structure as recoated or overcoated in a process of three steps of primer, midcoat and topcoat, in which an epoxy resin-based coating composition is much used for the undercoating and intermediate-coating. This is because an epoxy resin cured product has good adhesiveness to substrates and, in addition, it has a basic property of good anticorrosion. On the other hand epoxy resin based coating compositions are defective in their weather resistance in exposure environments, and in general, overcoating compositions of good weather resistance such as those with polyacylic resin, or fluoro resin are overcoated thereon.

For such heavy-anticorrosion coatings, in general, the epoxy resin coating composition must be recoated as intermediate coating after primer coating and as top-coating after the mid-coating within a predetermined period of time. This is because of the property of ordinary epoxy resin coating compositions in that the intercoat adhesion of the composition may be extremely lower after a certain period of time after coating.

The reasons of the property are described. It is well known that if one waits too long before overcoating, poor intercoat adhesion results. In that manner, in the case where recoating is applied to coated substrates after kept in exposure environments over a predetermined period of time, then so-called sand blasting or water-jet cleaning are needed for removing degraded films or debris from surface of the coating layer with an abrasive. However, when the coated substrates are super steel constructions, then the treatment is accompanied by technical and economical difficulties.

Heretofore, in the field of coating compositions that are referred to as heavy-anticorrosion coating compositions, a coating composition has been employed, in which an amide compound produced from a polymerized fatty acid and a polyethylene-polyamine or its adduct with a glycidyl ether compound added thereto is used as a curing agent and this is combined with an epoxy resin, preferably a solid epoxy resin having a relatively large molecular weight. However, when the substrates are kept in exposure environments for a long period of the time after undercoated, then there may occur some difficult problems in point of the recoatability.

A curing agent prepared by previously reacting a polyamide curing agent and a glycidyl ether compound is referred to as a polyamide-epoxide adduct, and it has been proven in this technical field; however, it is also defective in the resistance to long term exposure, and therefore it has some problems in point of the recoatability thereof with an overcoating composition.

Further, a curing agent for epoxy resin, which is prepared by reacting a phenolic compound such as phenol, cresol, butylphenol, nonylphenol or cardanol, with a polyamine and formaldehyde, has an excellent characteristic of rapid curability in a low temperature range, and has been proven in the field of heavy-anti-corrosion coating compositions. However, it is also not resistant to long-term exposure, and therefore it is also defective in that its recoatability with an overcoating composition.

Recently, in JP-A 2002-114835 (Patent reference 1), an amide-type curing agent for epoxy resin has been proposed, which is obtained by adding a glycidyl ether compound to amide compound produced from a polyamine compound that contains at least 50% of metaxylendiamine and a polymerized fatty acid. The curing agent may realize a good anticorrosive property in some degree but is still insufficient with regard to its recoatability with an overcoating composition.

An objective of the present invention is to provide a curing agent for epoxy resin and a coating composition comprising it, which may solve the problem in the prior art.

Another object of the present invention is to provide a curing agent for epoxy resin and coating competition comprising it, which basically have an excellent anticorrosive property and have good recoatability with overcoating composition after long term exposure.

BRIEF SUMMARY OF THE INVENTION

As a result of assiduous studies, the present inventors have found that using a polyoxyalkylene polyamine component having a specific constitution as a constitutive component solves the above-mentioned problems.

The curing agent for epoxy resin of present invention is based on the above-mentioned finding, and more precisely, it is curing agent for an epoxy resin, which has been obtained by addition of a glycidyl ether compound (c) to an amide-type reactant; the amide type reactant being obtained from a polyamine mixture (a) comprising 25-75 mol % of a polyoxyalkylene polyamine represented by following formula (1) or (2)

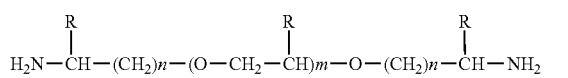

(1)

where R is hydrogen or methyl group, m is an integer of 10 or less, n is an integer of 3 or less,

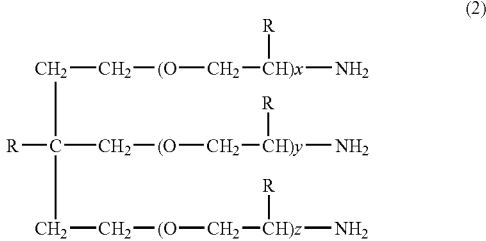

where R is hydrogen or methyl group, x+y+z≦6; reacted with a carboxylic acid component (b) selected from a polymerized fatty acid, a dicarboxylic acid having 4 to 18 carbon atoms, and a fatty acid having 10 to 20 carbon atoms (preferably, 15-20 carbon atoms), or a mixture thereof;

wherein 0.2 to 0.7 equivalent (preferably, 0.35-0.65 equivalent) of the carboxylic acid component (b), and 0.01 to 0.2 equivalent (preferably, 0.02-0.1 equivalent) of the glycidyl ether compound (c) are reacted with 1 equivalent of primary amino groups of the polyamine mixture (a).

The present invention also provides a curing agent for an epoxy resin, which has been obtained by mixing 25 to 75 mass % an amide type reactant (B1), and a reactant (B2), provided that the total mass of the amine-type reactant (B1) and reactant (B2) is 100 mass %;

the amide-type reactant (B1) being obtained by reacting a polyoxyalkylene polyamine (a1) represented by the above-mentioned formula (1) or (2) with a carboxylic acid component (b1) selected from a polymerized fatty acid, a dicarboxylic acid having 4 to 18 carbon atoms, a fatty acid having 10 to 20 carbon atoms (preferably, 15-20 carbon atoms), or a mixture thereof, wherein 0.2 to 0.7 equivalent (preferably, 0.35 to 0.65 equivalent) of the carboxylic acid component (b1) is reacted with 1 equivalent of the primary amino group of the polyoxyalkylene polyamine component (a1);

the reactant (B2) being obtained by adduction of 0.01 to 0.2 equivalent (preferably, 0.02 to 0.1 equivalent) of a glycidyl ether compound to an amino-type reactant; the amino-type reactant being obtained by reacting another polyamine (a2) with a carboxylic acid component (b2) selected from a polymerized fatty acid, a dicarboxylic acid having 4 to 18 carbon atoms, a fatty acid having 10 to 20 carbon atoms (preferably, 15-20 carbon atoms), or a mixture thereof, wherein 0.2 to 0.7 equivalent (preferably, 0.35 to 0.65 equivalent) of the component (b2) is reacted with 1 equivalent of amino group of the other polyamine (a2).

According to the present invention, there is further provided a coating composition containing at least the above-mentioned curing agent for epoxy resin, and a glycidyl ether compound.

The invention includes, for example, the following embodiments:

(1) A curing agent (A) obtained through addition of a glycidyl ether compound to an amide-type reactant obtained from a polyamine compound containing from 25 to 75 mol % of polyoxyalkylene-polyamine, and a carboxylic acid component comprising a polymerized fatty acid, and optionally another carboxylic acid selected from dicarboxylic acids having 4 to 18 carbon atoms, and fatty acids having 10 to 20, preferable 15 to 20, carbon atoms or a mixture thereof.

(2) A curing agent (B) obtained by mixing an amide-type reactant (B1) obtained through reaction of a polyoxyalkylene-polyamine with carboxylic acid component comprising a polymerized fatty acid, and optionally another carboxylic acid selected from dicarboxylic acids having 4 to 18 carbon atoms, and fatty acids having 10 to 20, preferable 15 to 20, carbon atoms or a mixture thereof, and reactant (B2) obtained through addition of glycidyl ether compound to an amide-type reactant obtained from another polyamine and carboxylic acid component comprising a polymerized fatty acid, and optionally another carboxylic acid selected from dicarboxylic acids having 4 to 18 carbon atoms, and fatty acids having 10 to 20, preferable 15 to 20, carbon atoms or a mixture thereof.

(3) A coating composition containing at least a curing agent selected from the curing agent (A) and/or the curing agent (B), and a glycidyl ether compound.

The novel curing agent for epoxy resin and the coating-composition comprising it of the present invention may solve the problem with conventional coating systems. For example, in the case where the curing agent for epoxy resin or the coating composition comprising it of the present invention is used, then the undercoated objects may be exposed to or left in natural environments for a long period of time before overcoating. Further, the present invention may overcome the defects of process limitations in conventional coating systems, and therefore it may significantly contribute to improving the rationalization, the energy-saving and the economy in the coating industry.

DETAILED DESCRIPTION OF THE INVENTION

Figure 1:
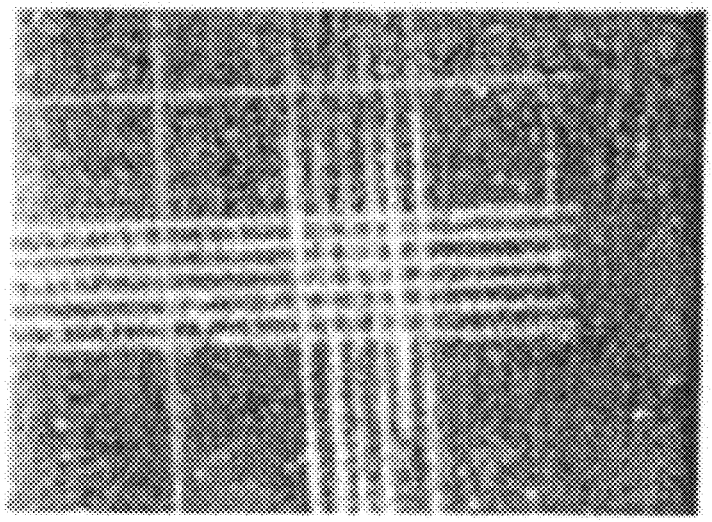
FIG. 1 The picture shows the recoatability test result after 12 weeks outdoor exposure of the coating practical example 1 using curing agent practical example 1.

The curing agent for epoxy resin and the coating composition comprising it of the present invention are described in detail herein below.

Curing Agent for Epoxy Resin

The curing agent for epoxy resin of the present invention includes the following first embodiment, as roughly grouped into them.

Curing Agent of First Embodiment

In this embodiment, the curing agent for epoxy resin of the present invention is a curing agent for epoxy resin obtained by the addition of a glycidyl ether compound (c) to an amide-type reactant that is obtained from polyamide compound (a) comprising from 25 to 75 mol % of a poloxyalkylene-polyamine represented by the following formula (1) or (2)

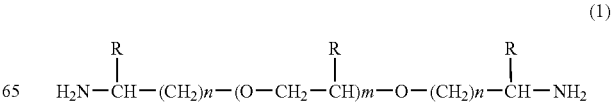

wherein R is a hydrogen atom or a methyl group, m is an integer of 10 or less; and n is an integer of 3 or less

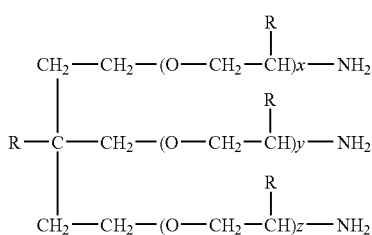

(2)

where R is a hydrogen atom or a methyl group, $x+y+z \leqq 6$, and 25 to 75 mol % of another polyamine;

and a carboxylic acid component (b) comprising a polymerized fatty acid, and optionally another carboxylic acids selected from dicarboxylic acids having 4 to 18 carbon atoms, and fatty acids having 10 to 20, preferable 15 to 20, carbon atoms or a mixture thereof, wherein from 0.2 to 0.7, preferably 0.35 to 0.65, equivalents of the carboxylic acid component (b) and from 0.01 to 0.2, preferably 0.02 to 0.1, equivalents of the glycidyl ether compound (c) are reacted with 1 equivalent of primary amino groups of the polyamine mixture (a).

Process for Producing Curing Agent for Epoxy Resin

There are two applicable procedures to make a curing agent of the first embodiment mentioned above. One is to conduct amine acid condensation first and then implement amine adduction. The other is to produce amine adduct first then conduct condensation of amine adduct and acid.

Curing Agent of Second Embodiment

In this embodiment, the curing agent for epoxy resin of the present invention is a curing agent for epoxy resin obtained by mixing an amide-type reactant (B1) that is obtained by reacting a polyoxyalkylene-polyamine (a1) represented by the following formula (1) or (2):

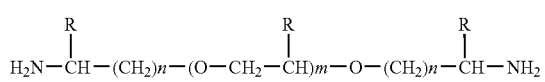

(1)

wherein R is a hydrogen atom or a methyl group, m is an integer of 10 or less; and n is an integer of 3 or less,

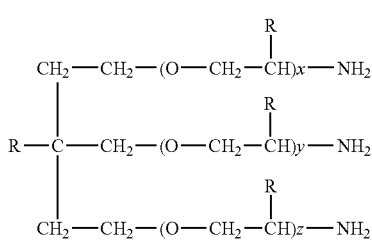

(2)

where R is a hydrogen atom or a methyl group, $x+y+z \leqq 6$ with a carboxylic acid component (b1) comprising a polymerized fatty acid and optionally a dicarboxylic acid having 4 to 18 carbon atoms, a fatty acid having 10 to 20, preferable 15 to 20, carbon atoms, or a mixture thereof, wherein 0.2 to 0.7, preferably 0.35 to 0.65, equivalents of the carboxylic acid component (b1) is reacted with 1 equivalent of primary amino group of the polyoxyalkylene polyamine component (a1); and a reactant (B2) that is obtained by the addition of from 0.01 to 0.2, preferably 0.02 to 0.1, equivalents of a glycidyl ether compound to an amide-type reactant prepared through reaction of another polyamine (a2) with a carboxylic acid component (b2) comprising a polymerized fatty acid and optionally a dicarboxylic acid having 4 to 18 carbon atoms, a fatty acid having 10 to 20, preferable 15 to 20, carbon atoms, or a mixture thereof, wherein 0.2 to 0.7, preferably 0.35 to 0.65, equivalents of the carboxylic acid component (b2) is reacted with 1 equivalent of primary amino group of the polyoxyalkylene polyamine component (a2); the two being mixed in such a ratio that the component (B1) is from 25 to 75 mass %.

Process for Producing Curing Agent for Epoxy Resin

There are two applicable procedures to make a curing agent of the second embodiment mentioned above. One is to conduct amine acid condensation first and then implement amine adduction. The other is to produce amine adduct first then conduct condensation of amine adduct and acid.

Preferred Ratio in Amount of Third Component

The curing agent for epoxy resin of the present invention contains the above-mentioned components as the indispensable components, and, if desired, may contain a third component (additive, etc.) mentioned below. In case where the agent containing any other component in addition to the above-mentioned indispensable components, then the total amount of the third component (calculated in terms of the solid content thereof) is preferably at most 200 mass %, more preferably at most 100% based on the total amount (100% mass) of the indispensable components.

Polyoxyalkylene-Polyamine

The polyoxyalkylene-polyamine for the component (a) for use in the present invention includes polyoxyethylene-diamine, polyoxypropylene-diamine, polyoxypropylene-triamine, polyoxytetramethylene-diamine represented by the above-mentioned formula (1) and (2). Of those, preferably used herein are oligomer-polyamines such as, for example, ethylene-glycol di(aminopropyl)ether, diethylene glycol di(aminopropyl)ether and Huntsman's commercial products, Jeffamine D230m Jeffamine D400 and JeffamineT-403.

Polyamines Except Polyoxyalkylene-Polyamine

In the present invention, "polyamines except polyoxyalkylene-polyamine" are, for example, aliphatic, araliphatic, or alicyclic polyamines having plural primary or secondary amino groups in the molecule.

Examples of Polyamines Except Pokyoxyalkylene-Polyamine

Examples of the "polyamines except polyoxyalkylene-polyamine" mentioned above include, for example, aliphatic polyamines such as aliphatic polyamine types of ethylenediamine, diethylenetriamine, triethylenetetramine, tetraethylenepentamine, pentaethylenehexamine and aliphatic amine and aminopropylated ethylenediamines such as N-3-aminopropyl ethylenediamine, N,N'-bis(3-aminopropyl)ethylenediamine, N,N,N'-tris(3-aminopropyl)ethylenediamine, dipropylene triamine, N-3-aminopropyl-1,3-diaminopropane, N,N'-bis(3-aminopropyl)-1,3-diaminopropane, and N,N,N'-tris(3-aminopropyl)-1,3-diaminopropane. Additionally hexamethylendiamine, trimethylhexamethylenediamine, 2-methylpentamethylenediamine and diethylaminopropylamine are included. The alicyclicpolyamines include isophoronediamine, 1,3-bisaminomethylcyclohexane, 1,2-bisaminomethylcyclohexane, 1,4-diamino-3,6-diethylcyclohexane, bis(4-amino-3-methyldicyclohexyl)methane, bis(4-aminocyclohexyl)methane, norbornanediamine, N-aminoethylpiperazine and 1,4-bis(3-aminopropyl)piperazine. Further examples of araliphatic amines, paraxylenediamine and metaxylenediamine are listed. Of those polyamines, preferred are triethylenetetramine, trimethylhexamethylenediamine, 2-methylpentamethylenediamine and metaxylenediamine.

Polymerized Fatty Acids

The polymerized fatty acids for use in producing the curing agent for epoxy resin of the present invention are those obtained through thermal polymerization of fatty acids of natural oils and fats, such as tall oil fatty acid, soybean oil fatty acid, rapeseed oil fatty acid, safflower oil fatty acid, cotton seed oil fatty acid. An example of typical commercial products is Uniqema's Pripol 1017 (composition dimer component 75-82%, trimer component 18-21%, monomer component 1-3%, acid value 192 to 197, viscosity 8,000 mPa·s). Polymerized fatty acids are also known as "dimerized" or "dimer" fatty acids, and refer, in a general way, to polymerized acids obtained from unsaturated fatty acids. They are described more fully in T. E. Breuer, Timer Acids, in J. I. Kroschwitz (ed.), Kirk-Othmer Encyclopedia of Chemical Technology, 4th Ed., Wiley, New York, 1993, Vol. 8, pp. 223-237, which is included by reference. Suitable for the purposes of the present invention are dimer fatty acids with a dimer content as measured by GC ranging from about 50 wt % to about 95 wt %, and a trimer and higher acid content of from about 3 wt % to about 40 wt %, the remainder being monomeric fatty acids.

Fatty Acids

The fatty acids for use in producing the curing agent for epoxy resin of the present invention may be any of natural fatty acids and synthetic fatty acids. More specifically, for example, they include natural fatty acids such those described in the starting materials for polymerized fatty acids, and/or synthetic fatty acids starting from petroleum materials. Preferred fatty acids include tall oil fatty acid and soya fatty acid.

Dicarboxylic Acids

Examples of the dicarboxylic acids having from 4 to 18 carbon atoms for use in producing the curing agent for epoxy resin of the present invention include adipic acid, azelaic acid, sebacic acid and dodecane diacid produced in various methods; Westvaco's commercial product, Diacid 1550, which is a reaction product of an unsaturated fatty acid and acrylic acid; and Okamura oil mill's commercial product, special dicarboxylic acid produced from butadiene and cyclohexanone.

Epoxides

The epoxide for use in producing the curing agent for epoxy resin of the present invention may be a glycidyl ether-type epoxide, and its more concrete examples include glycidyl ethers obtained through reaction of a bisphenol-type compound, such as bisphenol-A, bisphenol-F, bisphenol-S, tetrabromobisphenol-A, biphenol-hexafluoroacetone, tetramethylbisphenol-A, tetramethylbisphenol-F, tetrahydrobisphenol-F, hexahydrobisphenol-A, hydrogenated bisphenol-A and hydrogenated bisphenol-F with epichlorohydrin; glycidyl ethers obtained through reaction of a novolak, such as phenol-novolak, cresol-novolak, ethylphenol-novolak, propylphenol-novolak, butylphenol-novolak, pentylphenol-novolak, octylphenol-novolak and nonylphenol-novolak, with epichlorohydrin; glycidyl ether obtained through reaction of a polyphenol, such as catechol, resorcinol, trihydroxybipheyl, dihydroxybenzenphenone, bisresorcinol, hydroquinone, tris(hydroxyphenyl)methane, tetrakis (hydroxylphenyl)ethane, bixylenol, with epichlorohydrin; polyglycidyl ethers obtained through reaction of an aliphatic polyalcohol such as glycerin, neopentyl alcohol, ethylene glycol, propylene glycol, tetramethylene glycol, hexylene glycol, polyoxyethylene glycol and polyoxypropylene glycol, with epichlorohydrin; and glycidyl ethers obtained through reaction of an alcohol with epichlorohydrin, such as butylglycidyl ether, 2-ethyhexylglycidyl ether, phenyl glycidyl ether, cresyl glycidyl ether.

Of those, preferred are bisphenol-A type glycidyl ether, bisphenol-F type glycidyl ether, polyethyleneglycol diglycidyl ether. The epoxide for use in preparing the curing agent of the present invention can have epoxy equivalent weights ranging from 100 to 600.

Coating Composition

The coating composition according to the present invention comprises the above mentioned curing agent for epoxy resin of the present invention and an epoxy resin and optionally other ingredients. The coating composition according to the present invention may contain "another epoxide" in addition to the above-mentioned glycidyl ether type epoxide. For the "other-epoxide", usable are glycidyl ether ester type epoxides, glycidyl ester type epoxides, glycidyl aminoglycidyl ether type epoxides, glycidyl aminoglycidyl ester type epoxides, glycidyl amine type epoxide, epoxidized olefin type epoxides. The "other epoxide" may be used in place of the above-mentioned glycidylether type epoxide or along with the glycidyl ether type epoxide.

Other Epoxides

Examples of the "other epoxide" are the following:
(1) Glycidyl ether ester type epoxides obtained through reaction of hydroxycarboxylic acid, o-hydroxybenzoic acid, or β-hydroxynaphthoic acid, with epichlorohydrin.
(2) Glycidyl ester type epoxides obtained through reaction of phthalic acid, methylphthalic acid, isophthalic acid, terephthalic acid, tetrahydrophthalic acid, hexahydrophthalic acid, endomethylene-tetrahydrophthalic acid, endomethylene-hexahydrophthalic acid, trimellitic acid, polymerized fatty acid or carboxylic acid, with epichlorohydrin.
(3) Glycidyl aminoglycidyl ether type epoxides obtained through reaction of aminophenol or aminoalkylphenol with epichlorohydrin.
(4) Glycidyl ester of diglycidyl aminobenzoic acid that is aminobenzoic acid.

(5) Glycidyl amine type epoxides obtained through reaction of aniline, toluidine, 2,4,6-tribromoaniline, m-xylenediamine, 1,2-diaminocyclohexanone, 1,3-diaminocyclohexane, 1,4-diaminocyclohexane, 4,4,-diaminodiphenyl ether, 4,4-diaminodiphenylmethane, 4,4-diaminodiphenylsulfone, hydantoin, alkylhydantoin or cyanuric acid, with epichlorohydrin.

If desired, one or more such polyepoxides may be used, as combined.

Active Hydrogen Equivalent

Preferably, the active hydrogen equivalent of the curing agent for epoxy resin of the present invention falls within a range of from 150 to 250 in terms of the indispensable ingredients of the curing agent (not-including solvent, additive). The curing agent having an active hydrogen equivalent of lower than 150 may tend not only to lower the anticorrosive capability thereof but also to lower the expression of the recoating capability thereof after long term exposure that is an object of the present invention. On the other hand, the curing agent having an active hydrogen equivalent of higher than 250 may tend to increase the difficulty in its application to high-solid content systems and to remarkably lower the compatibility and curability thereof with liquid epoxy resin or semi-solid epoxy resin.

Solvents

If desired, the curing agent for epoxy resin of the present invention may be used, as dissolved in various solvent for improving its workability. Examples of the solvents includes aromatic hydrocarbons such as toluene, xylene, high-boiling point naphtha solvents; alcohols such as methanol, ethanol, normal propanol, isopropanol, normal butanol, isobutanol, benzyl alcohol; ether alcohols such as ethyleneglycol monobutyl ether, propyleneglycol monoethyl ether, ketones such as acetone, methylethyl ketone, methylisobutyl ketone, methylamyl ketone, diethyl ketone, cyclohexanone; ester solvents such as ethyl acetate, isopropyl acetate, normalbutyl acetate; terpene type hydrocarbons such as turpentine oil, D-limonene, pinene; and aliphatic high boiling point solvents such as mineral spirits.

Amount of Organic Solvent to be Used

The amount of the organic solvent to be used in the curing agent for epoxy resin is suitably from 0 to 200 mass parts, more preferably from 10 to 100 mass parts relative to 100 mass parts of the curing agent.

The amount of the organic solvent to be used in the coating composition is preferably from 0 to 200 mass parts, more preferably from 30 to 150 mass parts relative to 100 mass parts of epoxide.

Other Components

If desired, additives usable in ordinary coating compositions, such as other synthetic resins, non-reactive diluent, body pigment, anticorrosive pigment, color pigment, precipitation inhibitor, thixotropic agent, wetting agent, accelerator, water absorbent, may be added to the coating composition according to the present invention.

Coating Composition

The coating composition according to the present invention is a so called two-pack coating composition system that comprises a base component consisting essentially of an epoxy resin and a curing agent component for crosslinking and modifying it, like ordinary epoxy resin coating systems. In this case, in general, the base component amd the curing agent component are previously stored in separate containers as two components, and are mixed just before use.

Epoxy Resin Component

In the coating composition according to the present invention, the epoxy resin component is not specially defined. Accordingly, in the present invention, any epoxy resin component usable in ordinary epoxy resin coating composition systems may be used with no specific limitation thereon.

Preferable Coating Composition

The preferable coating composition according to the present invention is a coating composition that comprises the curing agent for epoxy resin of the present invention mentioned above and a glycidyl ether compound. The glycidyl ether compound for use in the coating composition comprise the epoxides for use in producing the curing agent for epoxy resin described above. The preferred epoxy resins include glycidyl ethers of bisphenol-A, bisphenol-F and novolac resins and mixtures thereof. The preferred epoxy resin for use in the coating composition can have epoxy equivalent weights ranging from 156 to 600.

Mixing Ratio Between Curing Agent and Epoxide

In the coating composition according to the present invention, mixing ratio between the curing agent according to the present invention and the epoxide (that is, the glycidyl ether compound) may vary depending on the type of the components to be blended, but in general, the two are preferably so formulated that the active hydrogen equivalent of curing agent may be reduced within a range of from 0.5-1.0, preferable 0.6 to 0.9, relative to 1 epoxy equivalent of the epoxide. In general, in case where the active hydrogen equivalent of the curing agent is excessive over the epoxy equivalent, then the chemical property of the coating composition may tend to worse; but on the other hand when the active hydrogen equivalent is too small, then the curing speed, the mechanical property and the chemical resistance thereof may tend to deteriorate. Accordingly, the active hydrogen equivalent of the curing agent is preferably within a range of from 0.5 to 1.0, preferable 0.6 to 0.9, relative to one equivalent of the epoxy compound.

PRACTICAL EXAMPLES

Hereinafter, the preferred practical examples of the present invention will be specifically shown.

Hereinafter curing agent and coating composition examples are shown, however the present invention is not restricted by the raw materials and composition hereinafter.

The raw materials are used to the comparison examples are as follows.

Amines

Ancamine 1922A: diethyleneglycol(diaminopropyl)ether MW(molecular weight)=220 (Air Products & Chemicals)
Jeffamine D230: polyoxypropylenediamine (Huntsman) AHEW (active hydrogen equivalent weight)=60

Jeffamine T403: polyoxypropylenetriamine (Huntsman) AHEW=80

MXDA: metaxylenediamine (Mitsubishi Gas Chemical) MW=136

Fatty Acids

Pripol1017: polymerized fatty acid (Uniqema) carboxyl group equivalent ca.290 Hartall FA-1:tall oil fatty acid (Harima Chemical) carboxyl group equivalent ca.290.

Epoxide Compounds

Epikote 828: diepoxide component (Hexion Specialty Chemicals) EEW (epoxy equivalent weight)=190
Epikote 1001: diepoxide component (Hexion Specialty Chemicals) EEW=475 SR-8EG: polyethylenglycoldiglycidylether (Sakamoto chemical) EE=285

Other Components

Phenol: (Nippon Steel Chemical) molecular weight 94
Cashew oil CX-1000: Cardanol (pentadecylphenol) average MW=300
Formalin: 37% formaldehyde solution (Mitsui Chemical) MW=81
Ethylenediamine (Tosoh) MW=60
Diethylenetriamine (Tosoh) MW=103
Triethylenetetramine (Tosoh) MW=146

Active Hydrogen Equivalent Weight

The active hydrogen equivalent weights as the curing agent property were determined by calculating their structure of reactants and their viscosities were examined by using BH-type rotating viscometer with No. 2 rotor at 10 rpm at 25° C. condition.

Curing Agent Practical Example: 1

Charged 238 grams (0.82 equivalent weight) of Pripol 1017, 5.8 grams (0.02 equivalent weight) of Hartall FA-1,110 grams (0.5 moles) of diethyleneglycol diaminopropyl ether and 68 grams of metaxylenediamine (0.5 moles) into the experimental apparatus being equipped with stirrer, thermometer, chiller, hydro extractor, heating device and dropping funnel, then conducted dehydration reaction at 180° C. under nitrogen atmosphere for 3 hours.

After the extracted water amount reached 15 grams, the system was cooled down to 80° C. then 51 grams of xylene diluted Epikote 1001 (resin content 75%; 0.08 equivalent weight) was charged slowly by dropping funnel, and it was stirred for 3 hours at the temperature. Additionally 43 grams of xylene and 55 grams of normal butanol were added, and then the system was adjusted its resin content to 80% and discharged. The finished system indicated AHEW (active hydrogen equivalent) 200 as the curing agent component and AHEW 250 as the whole solution. Its viscosity was 1,860 mPa·s.

Curing Agent Practical Examples: 2-8

With applying the formulation of Curing Agent Practical Example-2-8 in Table-1, the curing agents for epoxy resin were produced through the same procedure that was employed in Curing Agent Practical Example-1. As a remark in Table-1, polyamine components are featured by mole, on the other hand carboxylic acid and glycidyl components are described by equivalent weight.

Curing Agent Practical Example: 9

Charged 119 grams (0.41 equivalent weight) of Pripol 1017, 2.9 grams (0.01 equivalent weight) of Hartall FA-1, 68 grams (0.50 moles) of metaxylenediamine into the same experimental apparatus in Curing Agent Practical Example-1, then conducted dehydration reaction with stirring at 180° C. under nitrogen atmosphere for 3 hours. After the extracted water amount reached 7 grams, the system was cooled down to 80° C. then 51 grams of xylene diluted Epikote 1001 (resin content 75%; 0.08 equivalent weight) was charged slowly by dropping funnel, and it was stirred for 3 hours at the temperature. Additionally 43 grams of xylene and 55 grams of normal butanol were added. Finished product was amide type reactant. (B1)

Next, charged 119 grams (0.41 equivalent weight) of Pripol 1017, 2.9 grams (0.01 equivalent weight) of Hartall FA-1, 110 grams (0.5 moles) of Ancamine 1922 (diethyleneglycol diaminopropyl ether) into the same experimental apparatus in Curing Agent Practical Example-1, then conducted dehydration reaction with stirring at 180° C. under nitrogen atmosphere for 3 hours. After the extracted water amount reached 7 grams, the system was cooled down to 80° C., discharged and designated it as (B2).

Placed 330 grams of the synthesized reactant (B1) and 223.5 grams of (B2) into a glass bottle, mixed together well designating it "Curing Agent Practical Example: 9." The finished system indicated AHEW (active hydrogen equivalent) 200 as the curing agent component and AHEW 250 as the whole solution by calculation. Its viscosity was 1,930 mPa·s.

Curing Agent Practical Example: 10

Charged 104 grams (0.36 equivalent weight) of Pripol 1017, 20 grams (0.07 equivalent weight) of Hartall FA-1, 68 grams (0.50 moles) of metaxylenediamine into the same experimental apparatus in Curing Agent Practical Example-9, then conducted dehydration reaction with stirring at 180° C. under nitrogen atmosphere for 3 hours. After the extracted water amount reached 7 grams, the system was cooled down to 80° C. then 108 grams of benzyl alcohol additionally added slowly 30 grams of Epikote 828 (0.08 equivalent weight) by dropping funnel and it was stirred for 3 hours with maintaining the temperature then discharged and assigned (C1).

Secondly charged 101 grams (0.35 equivalent weight) of Pripol 1017, 17 grams (0.06 equivalent weight) of Hartall FA-1 and 110 grams (0.5 moles) of diethyleneglycol diaminopropyl ether 68 grams (0.50 moles) into the same experimental apparatus in Curing Agent Practical Example-9, then conducted dehydration reaction with stirring at 180° C. under nitrogen atmosphere for 3 hours. After the extracted water amount reached 7 grams, the system was cooled down to 80° C., discharged and assigned it as an amide type reactant (C2).

Placed 320 grams of the synthesized reactant (C1) and 219 grams of (C2) into a glass bottle, mixed together well then designated it as "Curing Agent Practical Example: 10". The finished system indicated AHEW (active hydrogen equivalent) 200 as the curing agent component and AHEW 250 as the whole solution by calculation. Its viscosity was 2,570 mPa·s.

Curing Agent Comparative Example: 1

Charged 162 grams (0.56 equivalent weight) of Pripol 1017,162 grams (0.56 equivalent weight) of Hartall FA-1, 73 grams (0.5 moles) of triethylenetetramine, 68 grams (0.5 moles) of metaxylenediamine into the same experimental apparatus in Curing Agent Practical Example-1, then conducted dehydration reaction with stirring at 180° C. under nitrogen atmosphere for 3 hours. After the extracted water amount reached 20 grams, the system was cooled down to 80° C., then 21 grams of Epikote 828 (0.11 equivalent weight) was charged slowly by dropping funnel, and it was stirred for 3 hours at the temperature. Additionally 58 grams of xylene and 58 grams of normal butanol were added, then the system was adjusted its resin content to 80% and discharged. The finished system indicated AHEW (active hydrogen equivalent) 200 as the curing agent component and AHEW 250 as the whole solution. Its viscosity was 1,160 mPa·s.

Curing Agent Comparative Example: 2-4

With applying the formulation of Curing Agent Comparative Example-2-4 in Table-2, the curing agents for epoxy resin were produced through the same procedure that was employed in Curing Agent Comparative Example-1. As a remark in Table-2, polyamine components are featured by mole, on the other hand carboxylic acid and glycidyl components are described by equivalent weight.

Curing Agent Comparative Example: 5

Mixed 136 grams (1 mole) of metaxylenediamine and 94 grams (1 mole) of phenol in the same experimental apparatus in Curing Agent Comparative Example-1, then 81 grams (1 mole) of formalin was charged slowly with stirring at 150° C. under nitrogen atmosphere for 3 hours. After the extracted water amount reached 69 grams, the system was cooled down to 100° C. Additionally added 60 grams of xylene and adjusted its resin content to 80% then discharged. The finished system indicated AHEW (active hydrogen equivalent) 81 as the curing agent component and AHEW 101 as the whole solution. Its viscosity is 1,000 mPa·s.

Curing Agent Comparative Example: 6

Mixed 90 grams (1.5 mole) of ethylenediamine and 300 grams (1 mole) of cashew oil CX-1000 in the same experimental apparatus in Curing Agent Comparative Example-5, then 162 grams (2 mole) of formalin was charged slowly with stirring at 150° C. under nitrogen atmosphere for 3 hours. After the extracted water amount reached 136 grams, the system was cooled down to 100° C. Additionally added 104 grams of xylene and adjusted its resin content to 80% then discharged. The finished system indicated AHEW (active hydrogen equivalent) 104 as the curing agent component and AHEW 130 as the whole solution. Its viscosity was 1,200 mPa·s.

Curing Agent Comparative Example: 7

Mixed 103 grams (1 mole) of diethylenetriamine, 131 grams of xylene and 289 grams of normal butanol in the same experimental apparatus in Curing Agent Comparative Example-6, then 633 grams of xylene diluted Epikote 1001 (resin content 75%; 1 equivalent weight) was charged slowly by dropping funnel, and it was stirred for 3 hours at the temperature. The system was adjusted resin content to 50% then discharged. The finished system indicated AHEW (active hydrogen equivalent) 145 as the curing agent component and AHEW 290 as the whole solution. Its viscosity was 1,300 mPa·s.

TABLE 1

Curing agent practical examples 2-8

| | Curing agent practical example | | | | | | |
|---|---|---|---|---|---|---|---|
| | 2 | 3 | 4 | 5 | 6 | 7 | 8 |
| TETA | | | | | | 0.50 | |
| MXDA | 0.50 | 0.50 | 0.25 | 0.75 | 0.50 | | 0.50 |
| Ancamine 1922A | | | 0.75 | 0.25 | 0.50 | 0.50 | 0.50 |
| Jeffamine D230 | 0.50 | | | | | | |
| Jeffamine 1403 | | 0.50 | | | | | |
| Pripol 1017 | 0.82 | 0.82 | 0.82 | 0.82 | 0.75 | 1.00 | 0.72 |
| Hartall FA-1 | 0.02 | 0.02 | 0.02 | 0.02 | 0.08 | 0.11 | |
| Epikote 828 | | | | | | | |
| Epokote 1001 | 0.08 | 0.08 | 0.08 | 0.08 | | | |
| SR-8EG (PEGDGE) | | | | | 0.08 | 0.11 | 0.08 |
| xylene (weight %) | 10.0 | 10.0 | 10.0 | 10.0 | | 10.0 | |
| n-butanol (weight %) | 10.0 | 10.0 | 10.0 | 10.0 | | 10.0 | |
| Benzyl alcohol (weight %) | | | | | 20.0 | | 20.0 |
| AHEW As required component | 198 | 165 | 204 | 186 | 200 | 200 | 160 |
| As supplied (solution) | 247 | 206 | 255 | 232 | 250 | 250 | 200 |
| Viscosity mPa·s (25° C.) | 2040 | 1760 | 1380 | 2940 | 2390 | 2130 | 1890 |

TABLE 2

Cuing Agent Comparative Example 2-4

| | Cuing agent practical example | | |
|---|---|---|---|
| | 2 | 3 | 4 |
| TETA | 1.00 | 1.00 | |
| MXDA | | | 1.00 |
| Ancamine 1922A | | | |
| Jeffamine D230 | | | |
| Jeffamine T403 | | | |
| Pripol 1017 | 1.51 | 1.07 | 0.70 |
| Hartall FA-1 | 0.14 | 0.37 | |
| Epikote 828 | | | 0.30 |
| Epokote 1001 | | 0.25 | |
| SR-8EG (PEGDGE) | | | |
| xylene (weight %) | 32.0 | 32.0 | 23.0 |
| n-butanol (weight %) | 8.0 | 8.0 | 7.0 |
| Benzyl alcohol (weight %) | | | |

TABLE 2-continued

Cuing Agent Comparative Example 2-4

| | | Cuing agent practical example | | |
|---|---|---|---|---|
| | | 2 | 3 | 4 |
| AHEW | As required component | 226 | 226 | 167 |
| | As supplied (solution) | 377 | 377 | 239 |
| Viscosity mPa · s (25° C.) | | 3000 | 2500 | 2700 |

Coating Composition Practical Example

The anti-corrosive coating system with employing the present invention so-called 2-pack mixing coating system is composed of epoxy resin part as primary one and curing agent part that cure by crosslinking, which components are stored in individual packages then are mixed to use just before application as well as conventional epoxy resin coating system. The present invention as has been mentioned comprises either base components of epoxy resin as primary part and also a new curing agent part that is described in the present patent. Hereinafter introduces the coating system comprising a new curing agent system that demonstrates excellent recoatability as the primary objective.

Generally the base resin part of epoxy coating system to be applied to anti-corrosion coatings is produced with adding various components in order to provide specific functions to meet the varied requirements. However in the coating composition practical examples, the simplified coating base resin systems were prepared and examined with focusing on recoatability.

In this coating composition practical example, the added raw materials were the following:

Cardura E-10: monoglycidyl ester (Hexion Specialty Chemicals)

EEW=245

Tipaque R-820: titanium dioxide (Ishihara Sangyo)

F-2 talc:talc (Fuji talc)

In this coating composition practical example, the employed recipe to the base component was as the follows.

Coating base component production example: Weighed 39 grams of Epikote 828, 10 grams of Cardura E-10, 37 grams of F-2 talc, 4 grams of Tipaque R-820, 5 grams of xylene and 5 grams of normal butanol by using glass bottles then dispersed and mixed to make coating base by using ball mill.

Coating Examination Example

Formulated the coating composition by employing the aforementioned base component and the curing agent practical examples (for epoxy resin) 1-10 and also the curing agent comparative examples (for epoxy resin). Here the curing agents were formulated 70% in their equivalent weight against 1 epoxy equivalent of the base component. Those coating compositions were examined for recoatability and conducted natural salt water spray resistance. The results are shown in Table-3 and Table-4

Recoatability Test-1

As previously described coating base component and curing agents in the practical and comparative examples were formulated, coated by 50 micron meter DFT (dry film thickness) on the sandblast treated steel substrates with applying bar-coater and dried for one day at ambient temperature. The coated substrates were exposed outdoor, after a certain period the same coating composition was recoated. The substrates were left for a week at 25° C. and then immersed in potable water for a week. The substrates were conducted cross cut test (1 mm nick interval, 25 lattices) in order to evaluate recoatability.

The recoatability evaluation criteria are the follows, the area of being flaked: ≦20% (Ex: excellent), (G: good): 21-40%, (F: fair): 41-60% and (P: poor):>60%.

Recoatability Test-2

As previously described coating composition was coated by 50 micron meter DFT (dry film thickness) on the sandblast treated steel substrates with applying bar-coater and dried for one day at ambient temperature. The coated substrates were exposed in the QUV-tester A-type produced by Q-PANEL for a certain period, the same coating composition was recoated. The substrates were left for a week at 25° C. and then immersed in potable water for a week. The substrates were conducted cross cut test (1 mm nick interval, 25 lattices) to evaluate recoatability.

The recoatability evaluation criteria are the follows, the area of being flaked: ≦20% (Ex: excellent), (G: good): 21-40%, (F: fair): 41-60% and (P: poor):>60%.

Recoatability Test-3

As previously described coating composition was coated by 50 micron meter DFT (dry film thickness) on the sandblast treated steel substrates with applying bar-coater and dried for one day at ambient temperature. The coated substrates were exposed outdoor, after a certain period, a polyurethane topcoat of Dalto#1000 produced by Tope was overcoated. The substrates were left for a week at 25° C. and then immersed in potable water for a week. The substrates were conducted cross cut test (1 mm nick interval, 25 lattices) to evaluate recoatability.

The recoatability evaluation criteria are the follows, flaked area: ≦20% (Ex: excellent), (G: good): 21-40%, (F: fair): 41-60% and (P: poor):>60%.

Recoatability Test-4

As previously described coating composition was coated by 50 micron meter DFT (dry film thickness) on the sandblast treated steel substrates with applying bar-coater and dried for one day at ambient temperature. The coated substrates were exposed in the QUV-tester A-type supplied by Q-PANEL for certain period, the polyurethane topcoat as the above mentioned was overcoated. The substrates were left for a week at 25° C. and then immersed in potable water for a week. The substrates were conducted cross cut test (1 mm nick interval, 25 lattices) to evaluate recoatability.

The recoatability evaluation criteria are the follows, flaked area: ≦20% (Ex: excellent), (G: good): 21-40%, (F: fair): 41-60% and (P: poor):>60%.

Natural Salt Water Spray Resistance

As previously described coating composition was coated by 50 micron meter DFT (dry film thickness) on the sandblast treated steel substrates with applying bar-coater. After 7 days for drying, the substrates were scratched by knife, then exposed in the salt spray tester (Type:SQ-800-ST) supplied by Itabashi Riko Industrory Co. Ltd. for 1000 hrs in accordance with JIS (Japan Industrial Standard)-K-5600 natural salt water spray resistance. After exposing the substrates were washed by water and observed blister of indicating surface degradation of the tested surface, stain, deterioration of adhesiveness creep caused by corrosion through scratch.

The evaluation criteria are the follows, no-damage by blister, stain, deterioration of adhesiveness, creep caused by corrosion through scratch: (G: good), damaged to some degree: (F: fair), damaged intensely: (P: poor).

TABLE 3

Coatings examination practical examples

| | | Coating Practical Example No. | | | | | | | | | |
|---|---|---|---|---|---|---|---|---|---|---|---|
| | | 1 | 2 | 3 | 4 | 5 | 6 | 7 | 8 | 9 | 10 |
| Curing agent loading (phr) | | 43 | 43 | 36 | 44 | 40 | 43 | 43 | 34 | 43 | 43 |
| Recoatability test-1 (Outdoor exposure) | 1 week | Ex | Ex | Ex | Ex | Ex | Ex | Ex | Ex | Ex | Ex |
| | 2 weeks | Ex | Ex | Ex | Ex | Ex | Ex | Ex | Ex | Ex | Ex |
| | 4 weeks | Ex | Ex | Ex | Ex | Ex | Ex | Ex | Ex | Ex | Ex |
| | 6 weeks | Ex | Ex | Ex | Ex | Ex | Ex | Ex | Ex | Ex | Ex |
| | 8 weeks | Ex | Ex | Ex | Ex | Ex | Ex | Ex | Ex | Ex | Ex |
| | 10 weeks | Ex | Ex | Ex | Ex | G | Ex | Ex | Ex | Ex | Ex |
| | 12 weeks | Ex | Ex | Ex | Ex | | Ex | Ex | Ex | Ex | Ex |
| Recoatability test-2 (QUV exposure) | 1 day | Ex | Ex | Ex | Ex | Ex | Ex | Ex | Ex | Ex | Ex |
| | 2 days | Ex | Ex | Ex | Ex | Ex | Ex | Ex | Ex | Ex | Ex |
| | 7 days | Ex | Ex | Ex | Ex | Ex | Ex | Ex | Ex | Ex | Ex |
| Recoatability test-3 (Outdoor exposure) | 1 week | Ex | Ex | Ex | Ex | Ex | Ex | Ex | Ex | Ex | Ex |
| | 2 weeks | Ex | Ex | Ex | Ex | Ex | Ex | Ex | Ex | Ex | Ex |
| | 4 weeks | Ex | Ex | Ex | Ex | Ex | Ex | Ex | Ex | Ex | Ex |
| | 6 weeks | Ex | Ex | Ex | Ex | Ex | Ex | Ex | Ex | Ex | Ex |
| | 8 weeks | Ex | Ex | Ex | Ex | Ex | Ex | Ex | Ex | Ex | Ex |
| | 10 weeks | Ex | Ex | Ex | Ex | G | Ex | G | Ex | Ex | Ex |
| | 12 weeks | Ex | Ex | Ex | Ex | | Ex | | Ex | Ex | Ex |
| Recoatability test-4 (QUV exposure) | 1 day | Ex | Ex | Ex | Ex | Ex | Ex | Ex | Ex | Ex | Ex |
| | 2 days | Ex | Ex | Ex | Ex | Ex | Ex | Ex | Ex | Ex | Ex |
| | 7 days | Ex | Ex | Ex | Ex | G | Ex | G | Ex | Ex | Ex |
| Natural salt water spray Resistance test | | G | G | G | F | G | F | F | F | G | G |

TABLE 4

Coatings examination comparative examples

| | | Coating Comparative Example No. | | | | | | |
|---|---|---|---|---|---|---|---|---|
| | | 1 | 2 | 3 | 4 | 5 | 6 | 7 |
| Curing agent loading (phr) | | 43 | 65 | 65 | 41 | 17 | 22 | 50 |
| Recoatability test-1 (Outdoor exposure) | 1 week | G | G | G | Ex | F | G | G |
| | 2 weeks | P | F | F | G | P | F | F |
| | 4 weeks | P | P | P | F | P | P | P |
| | 6 weeks | P | P | P | P | P | P | P |
| | 8 weeks | P | P | P | P | P | P | P |
| | 10 weeks | P | P | P | P | P | P | P |
| | 12 weeks | P | P | P | P | P | P | P |
| Recoatability test-2 (QUV exposure) | 1 day | F | G | G | G | F | F | F |
| | 2 days | P | P | P | P | P | P | P |
| | 7 days | P | P | P | P | P | P | P |
| Recoatability test-3 (Outdoor exposure) | 1 week | G | G | G | G | F | F | G |
| | 2 weeks | P | F | F | F | P | P | F |
| | 4 weeks | P | P | P | P | P | P | P |
| | 6 weeks | P | P | P | P | P | P | P |
| | 8 weeks | P | P | P | P | P | P | P |
| | 10 weeks | P | P | P | P | P | P | P |
| | 12 weeks | P | P | P | P | P | P | P |

TABLE 4-continued

Coatings examination comparative examples

| | | Coating Comparative Example No. | | | | | | |
|---|---|---|---|---|---|---|---|---|
| | | 1 | 2 | 3 | 4 | 5 | 6 | 7 |
| Recoatability test-4 (QUV exposure) | 1 day | F | F | F | P | P | P | F |
| | 2 days | P | P | P | P | P | P | P |
| | 7 days | P | P | P | P | P | P | P |
| Natural salt water spray Resistance test | | G | F | F | G | G | G | G |

Figure 2:
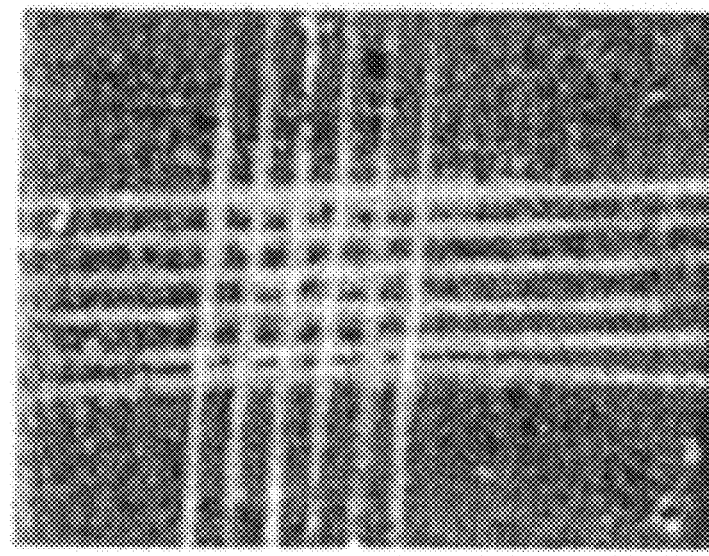
FIG. 2 The picture shows the recoatability test result after 12 weeks outdoor exposure of the coating practical example 7 using curing agent practical example 7.

The recoatability test results for 12 weeks outdoor exposure when employing the curing agent practical example 1 and 7 are shown by FIGS. 1 and 2

Figure 3:
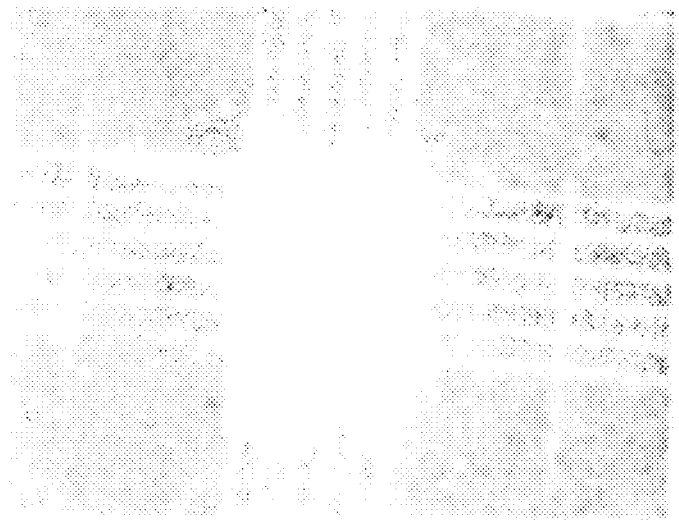
FIG. 3 The picture shows the recoatability test result after 12 weeks outdoor exposure of the coating comparative example 4 using curing agent comparative example 4.
Figure 4:
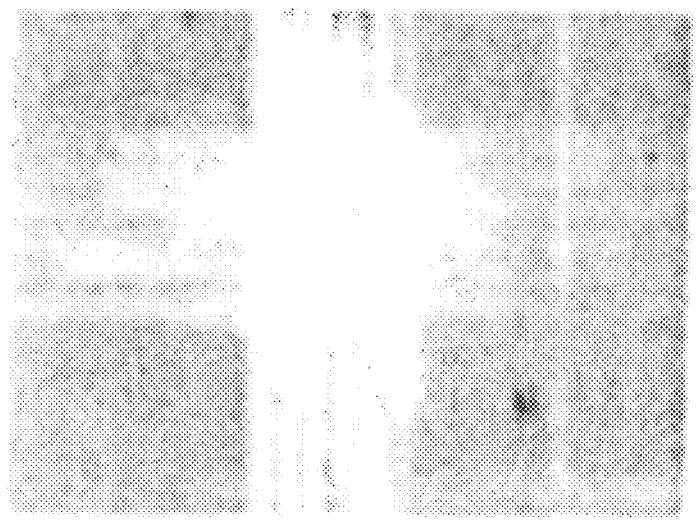
FIG. 4 The picture shows the recoatability test result after 12 weeks outdoor exposure of the coating comparative example 7 using curing agent comparative example 7.

The recoatability test results for 12 weeks outdoor exposure when employing the curing agent comparative example 4 and 7 are shown by FIGS. 3 and 4

Apparently from Table-3 and Table-4, the coating compositions shown as the coating composition practical examples from 1 to 10 which employed epoxy curing agents by the present invention of the curing agents consisted of polyamine component having 25-75 mole % polyoxyalkylene polyamine, polymerized fatty acid, dicarboxylic acids having from 4-18 carbon atoms, carboxylic acids selected from fatty acids having from 10 to 20, preferable carbon atoms or a mixture thereof and glycidylether component provided extremely superior recoatability after long time exposure than comparative examples from 1 to 7 of existing epoxy curing agents prepared through polyamine components not-having polyoxypropylene polyamine, polymerized fatty acids, amide components from fatty acids or modified amide components being adducted glycidylether components, polyamine components and reactants from phenol and formaldehyde.

The invention claimed is:

1. An epoxy resin curing agent which has been obtained by reacting a glycidyl ether compound (c) with an amide reactant; the amide reactant being obtained from a polyamine mixture (a) comprising 25-75 mol % of a polyoxyalkylene polyamine represented by following formula (1) or (2)

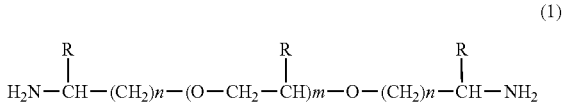

(1)

$$H_2N-CH(R)-(CH_2)n-(O-CH_2-CH(R))m-O-(CH_2)n-CH(R)-NH_2$$

(R: hydrogen or methyl group, m is an integer of from 1 to 10, n: an integer of 1 or 2)

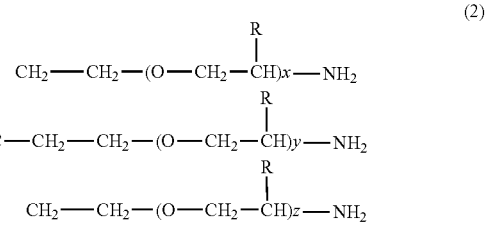

(2)

(R: hydrogen or methyl group and x+y+z is from 1 to 6);
reacted with a carboxylic acid component (b) selected from a polymerized fatty acid, and a fatty acid having 10 to 20 carbon atoms, or a mixture thereof;
wherein 0.2 to 0.7 equivalent of the carboxylic acid component (b), and 0.01 to 0.2 equivalent of the glycidyl ether compound (c) are reacted with 1 equivalent of primary amino groups of the polyamine mixture (a); and
wherein the curing agent has an active hydrogen equivalent in a range of 150 to 250; and,
further comprising at least one solvent.

2. The curing agent of claim 1 in which another polyamine other than the polyoxyalkylene polyamine is one or more selected from: an aliphatic polyamine, an alicyclic polyamine, and an aliphatic polyamine having an aromatic ring.

3. The curing agent of claim 1 in which the polyamine other than the polyoxyalkylene polyamine is one or more of an aliphatic polyamine having an aromatic ring, which is meta-xylenediamine and para-xylenediamine.

4. The curing agent of claim 1 in which the polyamine other than the polyoxyalkylene polyamine is meta-xylenediamine.

5. The curing agent of claim 1 wherein the curing agent has been obtained by reacting from 25 to 75 mass % an amide reactant (B1), and a reactant (B2), provided that the total mass of the amine reactant (B1) and reactant (B2) is 100 mass %;
the amide reactant (B1) being obtained by reacting a polyoxyalkylene polyamine (a1) represented by the following formula (1) or (2)

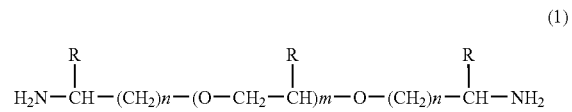
(1)

(R: hydrogen or methyl group, m is an integer of from 1 to 10, n: an integer of 1 or 2

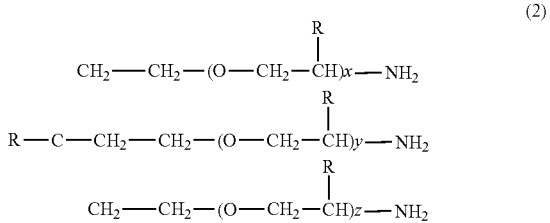
(2)

(R: hydrogen or methyl group and x+y+z is from 1 to 6);
with a carboxylic acid component (b1) selected from a polymerized fatty acid, a dicarboxylic acid having 4 to 18 carbon atoms, a fatty acid having 10 to 20 carbon atoms, or a mixture thereof, wherein 0.2 to 0.7 equivalent of the carboxylic acid component (b1) is reacted with 1 equivalent of a primary amino group of the polyoxyalkylene polyamine component (a1);
the reactant (B2) being obtained by adduction of 0.01 to 0.2 equivalent of a glycidyl ether compound to an amino reactant; the amino reactant being obtained by reacting another polyamine (a2) with a carboxylic acid component (b2) selected from a polymerized fatty acid, a fatty acid having 10 to 20 carbon atoms, or a mixture thereof, wherein 0.2 to 0.7 equivalent of the component (b2) is reacted with 1 equivalent of amino group of the other polyamine (a2).

6. The curing agent of claim 5 in which reactant (B1) is obtained by addition of 0.01 to 0.2 equivalents of glycidyl ether compound to the amide reactant.

7. The curing agent of claim 5 in which the polyamine other than the polyoxyalkylene polyamine is one or more of an aliphatic polyamine, an alicyclic polyamine, an aliphatic polyamine having an aromatic ring, or a mixture thereof.

8. The curing agent of claim 5 in which the polyamine other than the polyoxyalkylene polyamine is one or more of an aliphatic polyamine having an aromatic ring, which is meta-xylylenediamine and para-xylylenediamine.

9. The curing agent of claim 5 in which he polyamine other than the polyoxyalkylene polyamine is meta-xylylenediamine.

10. The curing agent according to claim 1, wherein the polyoxyalkylene polyamine is polyoxyethylene polyamine and/or polyoxypropylene polyamine.

11. The curing agent according to claim 1, wherein the polyoxyalkylene polyamine is diethylene glycol di(aminopropyl)ether.

12. The curing agent according to claim 1, wherein the polyamine other than the polyoxyalkylene polyamine is a compound having two or more primary or secondary amino groups.

13. The curing agent according to claim 5, wherein the polyamine other than the polyoxyalkylene polyamine is a compound having two or more primary or secondary amino groups.

14. The curing agent according to claim 1, wherein the glycidyl ether compound is derived from a diphenol and/or a dialcohol, and has an epoxy equivalent in a range of 100 to 600.

15. The curing agent according to claim 1, wherein the glycidyl ether compound is derived from a diphenol and/or a dialcohol, and has an epoxy equivalent in a range of 100 to 600.

16. The curing agent of claim 1 wherein the carboxylic acid component comprises at least one polymerized fatty acid selected from the group consisting of tall oil fatty acid, soybean oil fatty acid, rapeseed oil fatty acid, safflower oil fatty acid and cotton seed oil fatty acid.

17. The curing agent of claim 1 wherein the solvent comprises at least one member selected from the group consisting of xylene, n-butanol and benzyl alcohol.

18. The curing agent of claim 1 wherein the curing agent has a viscosity of 1380 at 25 C.

19. The curing agent of claim 1 wherein the curing agent has a viscosity of 2940 mPa*s at 25 C.

* * * * *

UNITED STATES PATENT AND TRADEMARK OFFICE
CERTIFICATE OF CORRECTION

PATENT NO. : 8,178,598 B2
APPLICATION NO. : 11/811800
DATED : May 15, 2012
INVENTOR(S) : Keisuke Hakuya et al.

It is certified that error appears in the above-identified patent and that said Letters Patent is hereby corrected as shown below:

Column 20, line 18

In claim 9 delete "he" and insert -- the --

Column 20, line 52

In claim 18 delete "25 C" and insert -- 25° C --

Column 20, line 54

Claim 19 delete "mPa*s at 25 C." and insert -- mPa•s at 25° C. --

Signed and Sealed this
Thirteenth Day of November, 2012

David J. Kappos
*Director of the United States Patent and Trademark Office*